Patented Dec. 22, 1953

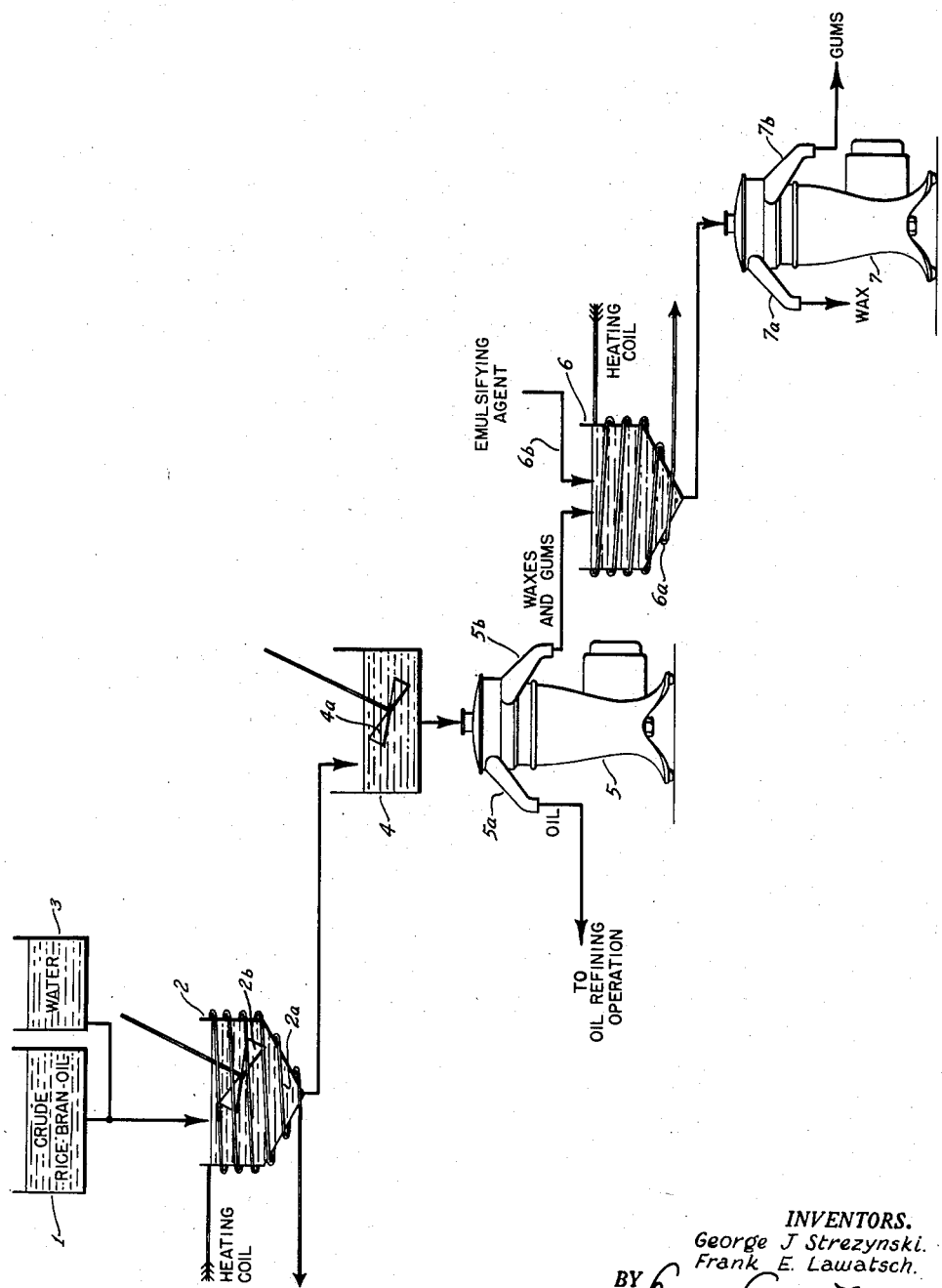

2,663,717

UNITED STATES PATENT OFFICE 2,663,717

RICE BRAN OIL PROCESS

George J. Strezynski, Poughkeepsie, and Frank E. Lawatsch, Kingston, N. Y., assignors to The De Laval Separator Company, Poughkeepsie, N. Y.

Application December 18, 1951, Serial No. 262,236

9 Claims. (Cl. 260—412)

This invention relates to the refining of rice bran oil and has for its principal object the provision of an improved process by which the gums and waxes in such oil can be recovered expeditiously as separate by-products in the refining of the oil.

The oil extracted from rice bran, as by means of solvent extraction, differs considerably from other vegetable or fatty oils. It contains about 1 to 1½% of gums or phosphatides which are very light and clean-colored and have potential value for commercial use. Moreover, the rice bran oil also contains large quantities of high-quality waxes, generally from 5 to 15%. These waxes are comparable in some respects to carnauba wax and would, if recovered, undoubtedly represent a valuable by-product. Due to this large quantity of waxes in addition to the gums, and the other peculiar characteristics of rice bran oil, conventional procedures for refining fatty oils are not as satisfactory when applied to the refining of rice bran oil. Principally, they do not enable an efficient recovery of both the gums and the waxes as separate by-products suitable for commercial use. In fact, the recovery of these by-products from rice bran oil has presented such difficulties in the past that the oil has generally been refined without regard to their recovery, the waxes and gums being discarded as impurities.

We have discovered that the waxes and gums can be readily recovered from the rice bran oil, as separate by-products, by first centrifuging the crude oil to extract a sludge containing most of the gums and waxes and then centrifuging the sludge to separate it into a wax phase, containing most of the oil remaining in the sludge, and a gum phase containing water from the sludge. However, in order to allow efficient recovery of the by-products in this manner, it is necessary to condition the crude oil to enable a satisfactory yield of pre-refined oil from the first centrifuging and concentrate the gums and waxes in the resulting sludge, and also to condition the sludge to permit effective separation of the waxes from the gums in the second centrifuging operation.

According to the invention, the crude rice bran oil containing gums and waxes is mixed with water for hydrating the gums, and the mixture is heated to a temperature of about 140° F. and then cooled slowly. After the cooling, the mixture is centrifuged to separate it into an oil component and a sludge component, the latter containing substantially all of the waxes and gums and also water and a minor proportion of the oil. The separated oil component, thus pre-refined, is subjected to the usual alkali refining operation, preferably with the use of soda ash. The sludge component from the centrifuging operation is reheated to a temperature substantially in excess of the first heating temperature, that is, substantially above 140° F., and preferably in the presence of an emulsifying agent. This reheated sludge is then re-centrifuged, with the result that it is separated into a wax sub-component containing most of the oil remaining in the sludge, and a gum sub-component containing most of the water in the sludge. The wax sub-component can then be further treated in any suitable manner to recover the oil remaining therein and obtain the wax in a substantially dry condition suitable for commercial use. The gum sub-component can be easily dehydrated to obtain the gums in a substantially pure form.

We have found that the process can best be practiced by agitating the crude oil and water mixture while it is being heated to the hydrating temperature of about 140° F. or while it is maintained at this temperature, then allowing the mixture to cool over a period of several hours to a temperature of about 80° F., and then re-agitating the mixture just before it is fed to the first centrifuging operation, and by reheating the sludge to a temperature of about 200° F. prior to the second centrifuging operation.

A preferred practice of the invention will now be described in connection with the accompanying drawing, in which the single illustration is a schematic view of a plant suitable for use in practicing the new process.

Referring to the drawing, the crude rice bran oil is delivered from a supply tank 1 into a conditioning vessel 2 where it is mixed with water supplied from a tank 3. The water is supplied in an amount equal approximately to five percent by weight of the crude oil. The vessel 2 is provided with a coil 2a through which a heating or cooling medium can be passed. The oil and water mixture is first heated to a temperature of about 140° F., as by passing steam through the coil 2a, and during this heating the mixture is agitated by means of an agitator 2b in the vessel. The mixture is then cooled slowly over a period of from 4 to 8 hours to a temperature of about 80° F. The cooling may be controlled by passing a suitable cooling medium through the coil 2a. Upon completion of the cooling operation, the mixture is delivered from vessel 2 to a supply tank 4 for a centrifugal separator 5. In the tank 4 the mixture is re-agitated by means of an agitator 4a, immediately before it enters the centrifuge 5.

The centrifuge 5 operates to separate the mixture centrifugally into a pre-refined oil component and a sludge component containing substantially all of the waxes and gums as well as some of the water and a small proportion of the oil. The oil component is discharged through centrifuge outlet 5a and may then be treated with soda ash to neutralize the free fatty acids and form soap stock, after which the soap stock is centrifugally separated from the refined oil and acidified to obtain an acid oil, which is of an amber or light color.

The sludge component is discharged from the centrifuge 5 through outlet 5b and passes into a treating vessel 6 provided with a heating coil 6a. An emulsifying agent, such as "Tretolite," is added to the oil in the vessel 6 from a supply line 6b, preferably in an amount equal to approximately .02% by weight of the sludge. The sludge is reheated in the vessel 6 to a temperature of approximately 200° F. and is then delivered to a second centrifuge 7. In the centrifuge 7, the reheated sludge is separated into a wax sub-component containing most of the remaining oil in the sludge, and a gum sub-component containing most of the water in the sludge, these two components being discharged through outlets 7a and 7b, respectively.

In a typical operation of the process, the de-waxed and de-gummed oil component discharged from the centrifuge outlet 5a represents approximately 94% recovery of pre-refined oil from the crude oil, and the wax-subcomponent discharged from centrifuge outlet 72 represents approximately 93.2% recovery of wax-oil from the sludge, this sub-component containing approximately 20.6% wax and 79.4% oil.

We have found that the temperature to which the water and oil mixture is heated in the first heating operation is extremely important. If this initial heating temperature is substantially less than 140° F., the hydration of the gums will be inadequate and consequently the degumming of the oil in the first centrifuging operation will be impaired. On the other hand, if the initial heating temperaeure is substantially above 140° F., an appreciable part, at least, of the waxes in the mixture will melt and form with the oil a tight emulsion which cannot be separated effectively by centrifuging.

The slow cooling step prior to the first centrifuging serves to "normalize" the waxes in the oil. That is, the various waxes in rice bran oil have different melting points and, when chilled, have different crystal sizes; and we have found that by heating the mixture to a point short of the relatively higher melting point of the larger crystals and thereafter cooling the mixture slowly, the small wax crystals apparently coalesce or undergo a regrouping so that the crystal sizes become quite uniform. Moreover, at the relatively low temperature in the first centrifuging operation, the hydrated gums and the "normalized" waxes are practically insoluble in the oil, so that a remarkably clean separation of the oil from the waxes and gums is obtained. The agitation of the cooled mixture just prior to the first centrifuging causes the feed to the first centrifuge to have substantially constant proportions of the waxes and gums in the oil.

In the second heating step, following the first centrifuging operation, the temperature to which the sludge is heated, being well above the hydrating temperature, is sufficient to melt the waxes completely and enable their clean separation from the gums in the second centrifuging. Since some oil is present in the slude, and the melted waxes tend to go into solution in this residual oil, the use of the emulsifier such as "Tretolite," is advantageous to facilitate the second centrifuging operation.

We claim:

1. A process for treating rice bran oil containing gums and waxes, which comprises mixing the oil with water in an amount sufficient to substantially hydrate the gums, heating the mixture to a hydrating temperature of about 140° F. and then cooling the mixture slowly, centrifuging the cooled mixture to separate it into an oil component and a sludge component, said sludge component containing substantially all of said waxes and gums as well as water and a minor proportion of the oil, reheating the separated sludge component to a temperature substantially in excess of said first temperature, and recentrifuging the heated sludge component to separate it into a wax sub-component, containing most of the oil in the sludge, and a gum sub-component containing most of the water in the slude.

2. A process according to claim 1, in which said slow cooling of the mixture is to a temperature of about 80° F.

3. A process according to claim 1, in which said reheating of the separated sludge component is to a temperature of about 200° F.

4. A process according to claim 1, comprising also the step of agitating the oil and water mixture during said first heating.

5. A process according to claim 1, comprising also the step of agitating the oil and water mixture during said first heating, said cooling being effected while the mixture is relatively quiescent.

6. A process according to claim 1, comprising also the step of agitating the oil and water mixture during said first heating, said cooling being effected while the mixture is relatively quiescent, and then reagitating the mixture prior to said first centrifuging.

7. A process according to claim 1, in which said cooling is effected over a period of several hours.

8. A process according to claim 1, comprising also the step of adding an emulsifying agent to the sludge component prior to said recentrifuging.

9. A process for treating rice bran oil containing gums and waxes, which comprises mixing the oil with water in an amount sufficient for hydrating the gums, heating the mixture to a temperature of about 140° F. and agitating the heated mixture, cooling the mixture slowly to a temperature of about 80° F., then registering the cooled mixture and promptly centrifuging it to separate it into an oil component and a sludge component, said sludge component containing substantially all of said waxes and gums as well as water and a minor proportion of the oil, reheating the separated sludge component, in the presence of an emulsifying agent, to a temperature of about 200° F., and recentrifuging the heated sludge component to separate it into a wax sub-component, containing most of the oil in the sludge, and a gum sub-component containing most of the water in the sludge.

GEORGE J. STREZYNSKI.
FRANK E. LAWATSCH.

References Cited in the file of this patent

UNITED STATES PATENTS

| Number | Name | Date |
|---|---|---|
| 1,737,402 | Ayres et al. | Nov. 26, 1929 |
| 2,206,210 | Thurman | July 2, 1940 |
| 2,513,687 | Strezynski | July 4, 1950 |